US012612926B2

(12) United States Patent
Wang et al.

(10) Patent No.: US 12,612,926 B2
(45) Date of Patent: Apr. 28, 2026

(54) FAN BLADE, FAN AND FAN LAMP

(71) Applicants: SUZHOU OPPLE LIGHTING CO., LTD., Suzhou City (CN); OPPLE LIGHTING CO., LTD., Shanghai (CN)

(72) Inventors: Yaowei Wang, Suzhou City (CN); Xingan Liu, Suzhou City (CN); Guobao Zhang, Suzhou City (CN); Xiaolei Wang, Suzhou City (CN)

(73) Assignees: SUZHOU OPPLE LIGHTING CO., LTD., Suzhou City (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 19/095,000

(22) Filed: Mar. 30, 2025

(65) Prior Publication Data

US 2025/0243873 A1 Jul. 31, 2025

Related U.S. Application Data

(63) Continuation of application No. PCT/CN2023/119631, filed on Sep. 19, 2023.

(30) Foreign Application Priority Data

Sep. 30, 2022 (CN) ......................... 202211206982.0
Sep. 30, 2022 (CN) ......................... 202222604396.3

(51) Int. Cl.
*F04D 29/38* (2006.01)
*F04D 25/08* (2006.01)
*F21V 33/00* (2006.01)

(52) U.S. Cl.
CPC ........... *F04D 29/384* (2013.01); *F04D 25/08* (2013.01); *F21V 33/0096* (2013.01)

(58) Field of Classification Search
CPC ...... F04D 29/384; F04D 29/32; F04D 29/362; F04D 29/38; F04D 25/08; F04D 25/088; F21V 33/0096; F21V 33/00
See application file for complete search history.

(56) References Cited

U.S. PATENT DOCUMENTS 2,043,736 A * 6/1936 Charavay .............. F04D 29/386 416/238
3,758,231 A * 9/1973 Barnstead ............. F04D 29/382 416/240

(Continued)

FOREIGN PATENT DOCUMENTS

CN 104169587 A 11/2014
CN 108457900 A 8/2018

(Continued)

OTHER PUBLICATIONS

International Search Report issued in PCT Application No. PCT/CN2023/119631 dated Dec. 11, 2023, (6p).

*Primary Examiner* — Nathaniel E Wiehe
*Assistant Examiner* — Wayne A Lambert
(74) *Attorney, Agent, or Firm* — Arch & Lake LLP; Hao Tan; Shen Wang

(57) ABSTRACT

A fan blade, a fan and a fan lamp. The fan blade includes: a blade root; a blade tip; a leading edge, which connects the blade root to the blade tip and is located on a windward side; and a trailing edge, which connects the blade root to the blade tip and is located on a leeward side, wherein the leading edge is configured in a wavy shape from the blade root towards the blade tip, the trailing edge is configured in an arc shape, and the distance between the leading edge and the trailing edge increases first and then decreases from the blade root towards the blade tip.

14 Claims, 6 Drawing Sheets

(56) References Cited

U.S. PATENT DOCUMENTS

| | | | | | |
|---|---|---|---|---|---|
| 4,840,541 | A * | 6/1989 | Sakane | F04D 29/384 416/223 R |
| 5,393,199 | A * | 2/1995 | Alizadeh | F04D 29/384 416/189 |
| 5,906,179 | A * | 5/1999 | Capdevila | F04D 29/326 416/223 R |
| 6,238,184 | B1 * | 5/2001 | Giribaldi | F04D 29/326 416/223 R |
| 7,600,980 | B2 * | 10/2009 | Sato | F04D 29/386 416/241 A |
| 10,458,427 | B2 * | 10/2019 | McGill | F04D 29/544 |
| 10,480,527 | B2 | 11/2019 | Van Houten et al. | |
| 10,851,655 | B2 | 12/2020 | Gonzalez-Gutierrez | |
| 11,280,350 | B2 | 3/2022 | Li | |
| 2006/0165526 | A1 * | 7/2006 | Cho | F04D 29/384 415/220 |
| 2010/0202882 | A1 * | 8/2010 | Liu | F04D 29/362 416/214 R |
| 2012/0045331 | A1 * | 2/2012 | Villella | F04D 29/362 416/5 |
| 2013/0189109 | A1 | 7/2013 | Noble | |
| 2017/0159543 | A1 * | 6/2017 | Hong | F04D 29/384 |
| 2018/0238174 | A1 | 8/2018 | Gonzalez-Gutierrez | |
| 2018/0320705 | A1 | 11/2018 | Van Houten et al. | |
| 2019/0383295 | A1 * | 12/2019 | Eggers | F04D 29/601 |
| 2020/0362878 | A1 | 11/2020 | Li | |
| 2021/0115938 | A1 * | 4/2021 | Chen | F04D 29/362 |

FOREIGN PATENT DOCUMENTS

| | | | | | |
|---|---|---|---|---|---|
| CN | 110799758 | A | | 2/2020 | |
| CN | 210196068 | U | | 3/2020 | |
| CN | 112324709 | A | * | 2/2021 | F04D 29/325 |
| CN | 112525587 | A | | 3/2021 | |
| CN | 217002339 | U | | 7/2022 | |
| CN | 114909308 | A | | 8/2022 | |
| CN | 218062795 | U | | 12/2022 | |
| GB | 2345094 | A | * | 6/2000 | F04D 29/326 |

* cited by examiner

FAN BLADE, FAN AND FAN LAMP

CROSS REFERENCES TO RELATED APPLICATIONS

This application claims the priority of PCT patent application No. PCT/CN2023/119631 filed on Sep. 19, 2023 which claims the priority of the Chinese patent application with an application No. 202211206982.0 and filed on Sep. 30, 2022, and the Chinese patent application with an application No. 202222604396.3 filed on Sep. 30, 2022, and the entire contents of which are incorporated by reference herein for all purposes.

TECHNICAL FIELD

The present disclosure relates to a fan blade, a fan and a fan lamp, belonging to the technical field of household appliances.

BACKGROUND

With the gradual improvement of people's living standards, fan lamps with large air volume, large blowing angle, and low noise are urgent needs of people.

SUMMARY

The present disclosure provides a fan blade, a fan and a fan lamp.

The present disclosure provides a fan blade which may include a blade root, a blade tip, a leading edge connecting the blade root and the blade tip and the leading edge is located on a windward side, and a trailing edge connecting the blade root and the blade tip and the trailing edge is located on a leeward side, the leading edge is arranged in a wavy shape from the blade root toward the blade tip, and the trailing edge is arranged in an arc shape, such that a distance between the leading edge and the trailing edge first increases and then decreases from the blade root toward the blade tip.

The present disclosure also provides a fan which may include a hub and the above described fan blade connected to the hub.

The present disclosure further provides a fan lamp which may include a rotating disk and a plurality of fan blades as described above, the plurality of fan blades are arranged on the rotating disk in a retractable or expandable manner.

It is to be understood that both the foregoing general description and the following detailed description are exemplary and explanatory only and are not restrictive of the present disclosure.

DETAILED DESCRIPTION

Figure 1:
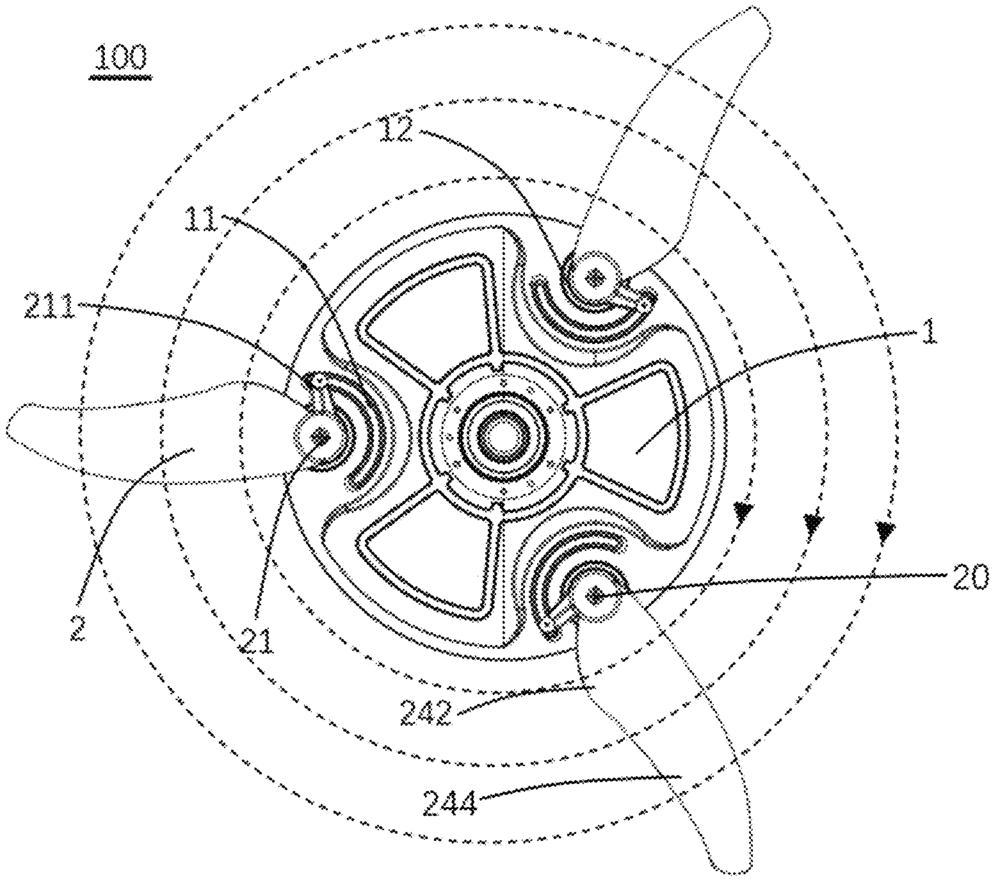
FIG. 1 is a schematic perspective view of a fan lamp in a first state according to an example of the present disclosure.
Figure 2:
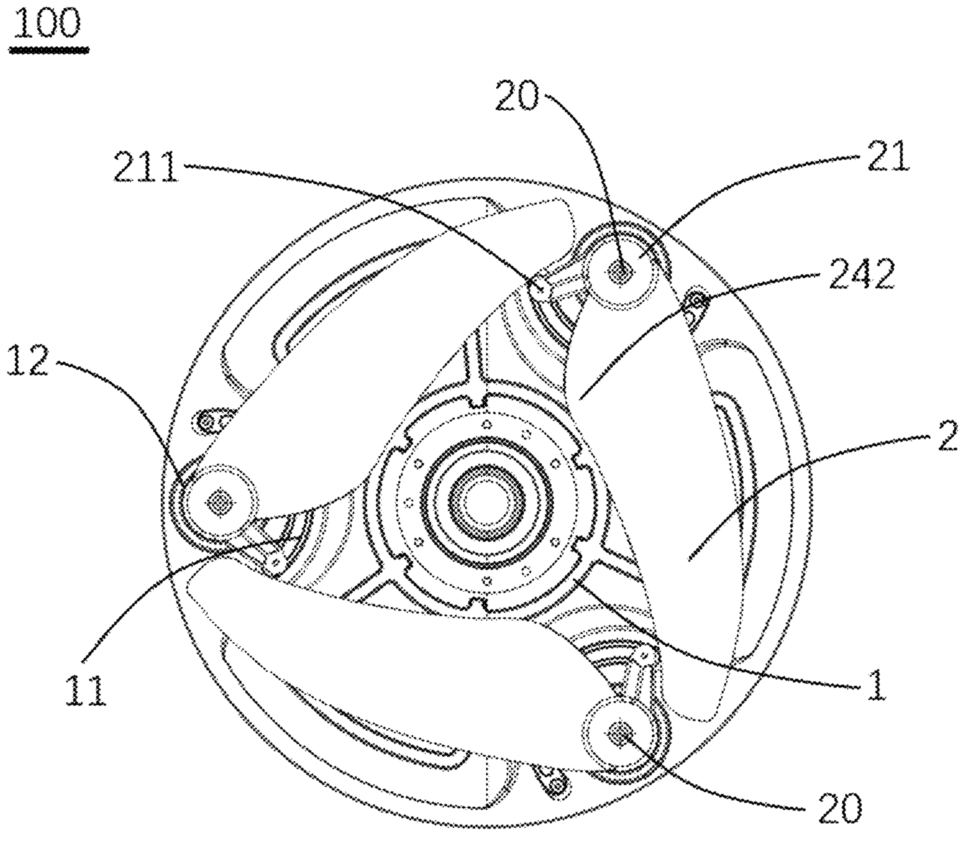
FIG. 2 is a schematic perspective view of a fan lamp in a second state according to an example of the present disclosure.

In order to make the purpose, technical solutions and advantages of the present disclosure clearer, the present disclosure will be described in detail below with reference to the accompanying drawings and examples.

Explanation of reference numerals may include: 100—fan lamp, 1—rotating disk, 11—guide groove, 12—mounting hole, 13—first connecting line, 14—second connecting line; 2—fan blade, 20—center point, 21—mounting portion, 211—guide member, 22—blade root, 23—blade tip, 231—first arc, 232—second arc, 233—straight edge, 24—leading edge portion, 241—leading edge, 242—convex part, 243—leading edge point, 244—concave part, 245—tangent point, 25—trailing edge portion, 251—trailing edge, 26—chord line, 261—blade length, 27—upper surface, 28—lower surface, 29—maximum thickness, 30—middle arc line, 31—maximum camber, 32—rotation plane, 321—blade height, β—installation angle.

Some fan lamp products have sufficient air volume, but the blowing area is small, the wind speed in the blowing area is concentrated, there is a periodic noise of "flapping" under the fan lamp, an impact feeling of air supply pressure is strong, and a probability of shaking is high, which have brought users a poor user experience.

In view of this, it is indeed necessary to propose improvements to fan lamps to solve the above problems.

Referring to FIG. 1 to FIG. 4, the present disclosure discloses a fan lamp 100 that combines a lamp and a fan to meet people's needs for different functions and improve the practicality of the product. Specifically, the fan lamp 100 includes a hanger fixed to a mounting surface (not shown), a shaft, a rotating disk 1, a lamp assembly (not shown) and a fan blade 2. An end of the shaft is fixedly connected to the hanger, the other end of the shaft is connected to the rotating disk 1 and allows the rotating disk 1 to rotate around the shaft, and the fan blade 2 is rotatably connected to the rotating disk 1 and is arranged on the side of the rotating disk 1 close to the shaft, so that the rotating disk 1 can drive the fan blade 2 to rotate synchronously, the lamp assembly is arranged on the side of the rotating disk 1 away from the shaft and can rotate synchronously with the rotating disk 1 under the drive of the rotating disk 1. In other examples, the lamp assembly does not need to rotate synchronously with the rotating disk 1, that is, the lamp assembly is fixedly connected to the shaft, and the rotating disk 1 rotates relative to the lamp assembly, and there is no limitation here.

In this example, the specific structure of the lamp assembly, the specific structure of the hanger and the shaft, and the connection manner between the lamp assembly and the rotating disk 1 and/or the shaft can be designed according to the certain technology and will not be described in detail here. The present disclosure's improvement point lies in the fan blade 2 and the connection manner between the fan blade 2 and the rotating disk 1, and the following specification will describe this improvement point.

The fan lamp 100 is provided with a plurality of fan blades 2 connected to the rotating disk 1, and the plurality of fan blades 2 are arranged on the rotating disk 1 in a retractable or expandable manner. Specifically, the rotating disk 1 is provided with a mounting hole 12, an end of the fan blade 2 is provided with a mounting portion 21 corresponding to the mounting hole 12, and the mounting portion 21 extends into the mounting hole 12 and can rotate in the mounting hole 12 to realize the rotational connection between the fan blade 2 and the mounting portion 21. When the rotating disk 1 rotates, the end of the fan blade 2 away from the mounting portion 21 moves around the mounting portion 21 in a direction away from the rotating disk 1 under the action of centrifugal force to realize the expansion of the fan blade 2, and the expanded fan blade 2 are driven by the rotating disk 1 to rotate so as to achieve outward air blowing. When the rotating disk 1 stops rotating, an end of the fan blade 2 away from the mounting portion 21 moves around the mounting portion 21 toward the direction close to the rotating disk 1 under the action of inertia, so as to achieve the retraction of the fan blade 2.

Preferably, the fan blade 2 further includes a guide member 211 connected to the mounting portion 21, and the rotating disk 1 is provided with a guide groove 11 corresponding to the guide member 211. When the mounting portion 21 is received in the mounting hole 12, the guide member 211 is received in the guide groove 11, the guide groove 11 is provided at a side of the mounting hole 12 and is arranged in an arc shape. When the fan blade 2 is retracted in the rotating disk 1, the guide member 211 abuts against an end of the guide groove 11. When the rotating disk 1 rotates, the fan blade 2 expands under the action of centrifugal force. At the same time, the guide member 211 slides from one end of the guide groove 11 to the other end of the guide groove 11 until the guide member 211 abuts against the other end of the guide groove 11, restricting the fan blade 2 from continuing to rotate relative to the rotating disk 1, thereby pushing the air to form an airflow and blowing out.

In this example, the rotating disk 1 is provided with three fan blades 2 and three guide members 211 and guide grooves 11 corresponding to the fan blades 2, and the three fan blades 2 are arranged centrally symmetrically on the rotating disk 1. In other examples, the rotating disk 1 can also be provided with other numbers of fan blades 2, such as two, four, five, etc. number of fan blades 2, as long as the fan blades 2 are centrally symmetrically on the rotating disk 1 Just set it symmetrically and there is no restriction here.

Figure 5:
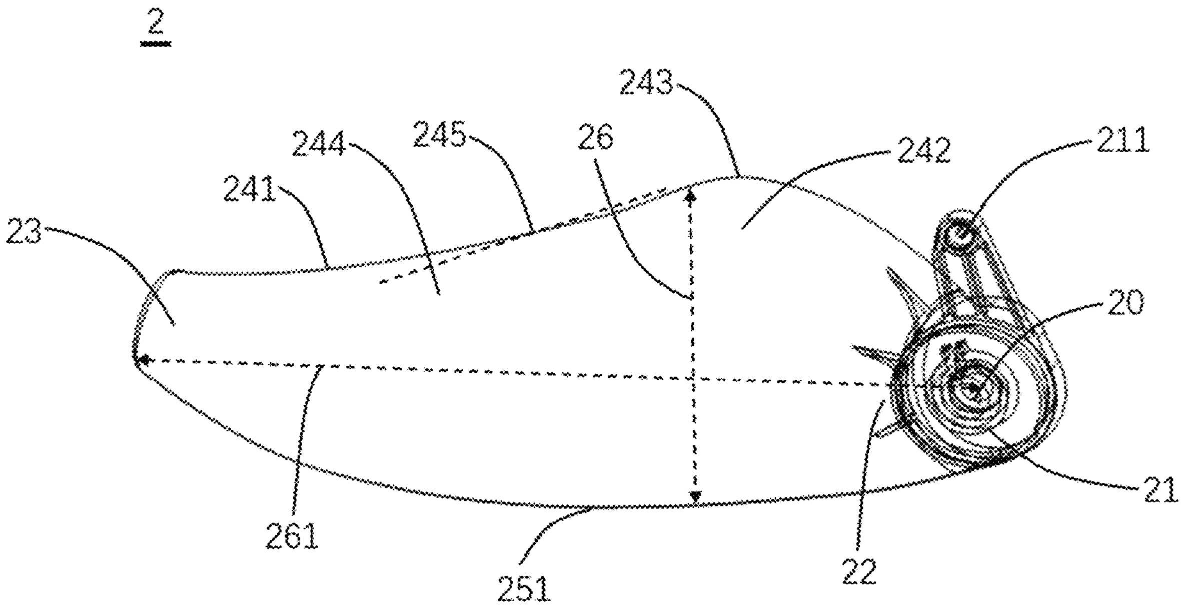
FIG. 5 is a schematic perspective view of the fan blade in FIG. 4.

Referring to FIG. 1 and FIG. 5, the fan blade 2 includes a blade root 22, a blade tip 23, a leading edge 241 connecting the blade root 22 and the blade tip 23 and located on a windward side, and a trailing edge 251 connecting the blade root 22 and the blade tip 23 and located on a leeward side. The mounting portion 21 and the blade root 22 are fixedly connected at a certain angle. On the one hand, the fan blade 2 is connected to the rotating disk 1 through the mounting portion 21, and on the other hand, the fan blade 2 is tilted, so as to drive the air flow when the fan blade 2 rotates.

Figure 3:
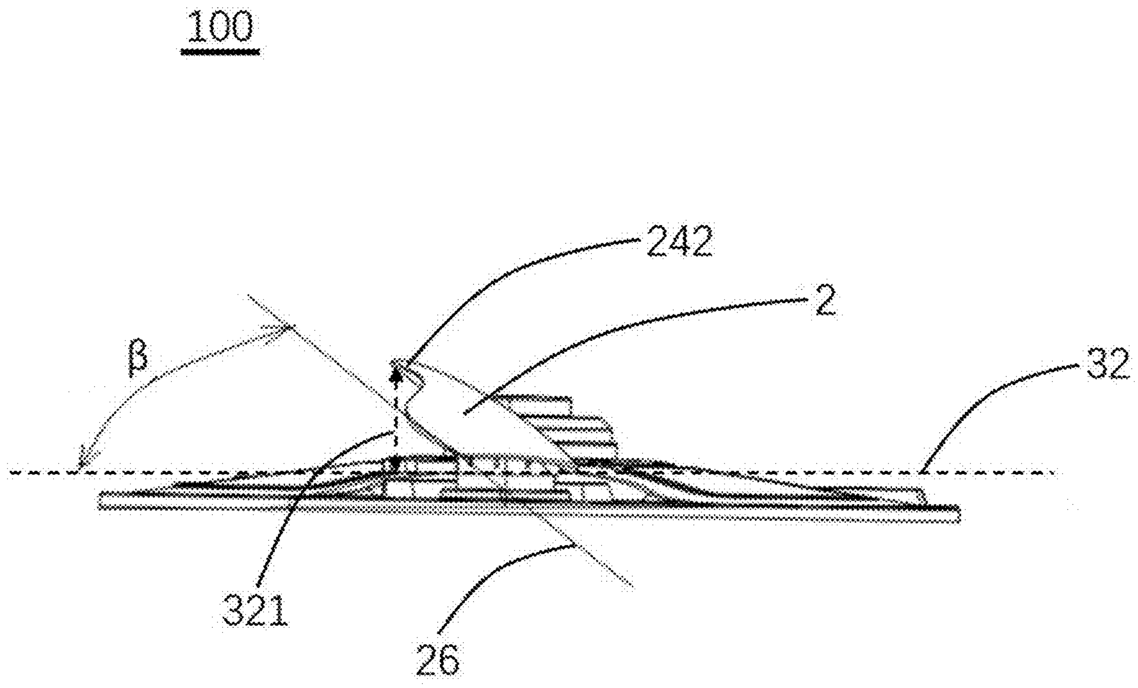
FIG. 3 is a schematic perspective view of the fan lamp in FIG. 1 from another angle.

As shown in FIG. 3, in the direction perpendicular to a direction from the blade root 22 to the blade tip 23, the line connecting the leading edge 241 and the trailing edge 251 is defined as the chord line 26, and the length of the chord line 26 is the chord length. In the direction from the blade root 22 to the blade tip 23, the chord length first increases and then decreases, and the plane formed when the rotating disk 1 rotates is the rotation plane 32, the installation angle β between the chord line 26 and the rotation plane 32 is in a range from 21° to 36°, and the installation angle β between the chord line 26 close to the blade tip 23 and the rotation plane 32 is in a range from 21° to 29°. Preferably, the fan blade 2 is quartered in the direction from the blade root 22 to the blade tip 23, and the installation angle β between the chord line 26 close to the blade tip 23 and within a quarter of the blade tip 23 and the rotation plane 32 is in a range from 21° to 29°.

Specifically, because the fan blade 2 of the present disclosure is three-dimensional when assembled, the rotation plane 32 can also be understood as the lowest plane when the fan blade 2 rotates, that is, the plane formed by at least part of the trailing edge 251 when it rotates. In this example, the fan blade 2 is connected to the rotating disk 1 so that the trailing edge 251 is approximately located on the same plane. When the fan blade 2 rotates, the plane formed by the trailing edge 251 is the rotation plane 32. When the blades 2 are gathered, all the trailing edges 251 also form a plane on the rotation plane 32. In other examples, the trailing edges 251 do not need to be located in the same plane. In this case, when the fan blade 2 rotates, the plane formed by the lowest points of the trailing edge 251 is the rotation plane 32, which is not limited here.

The connecting point of the fan blade 2 and the rotating disk 1 is defined as the center point 20, and the distance between the leading edge 241 and the rotation plane 32 is the blade height 321. Specifically, the blade height 321 is in a trend of increasing first and then decreasing from the blade root 22 to the blade tip 23 of the fan blade 2, and the blade height 321 reaches the maximum value at the frontmost point on the leading edge 241 (i.e., the leading edge point 243 in the following). In this example, the blade height 321 is in a trend of continuing to increase in a range from the frontmost point on the leading edge 241 to the blade root 22. There is a fast descending stage and a decreasing stage in the range extending from the frontmost point of the leading edge 241 to the blade tip 23. The line connecting the blade tip 23 and the center point 20 is defined as the blade length 261, the projection of the fast descending stage on the blade length 261 is the first stage, and the projection of the decreasing stage on the blade length 261 is the second stage, the first stage is connected with the second stage, a ratio of a distance between any point in the first stage and the center point 20 to a length of the blade length 261 is less than 60%, that is, a ratio of a distance between the center point 20 and the junction of the first stage and the second stage to a length of the blade length 261 is 60%; a ratio of a distance between any point in the second stage and the center point 20 to the length of the blade length 261 is in a range from 60% to 100%, that is, the end of the second stage away from the first stage is located at the blade tip 23.

In other examples, the decreasing stage may further include a slow decreasing stage and a rapid decreasing stage, the slow decreasing stage is connected to the fast descending stage and the rapid decreasing stage, respectively, so that the blade height 321 from the blade root 22 to the blade tip 23 changes in a trend of first increasing, then fast descending, then slowly decreasing, and finally rapidly decreasing.

Figure 4:
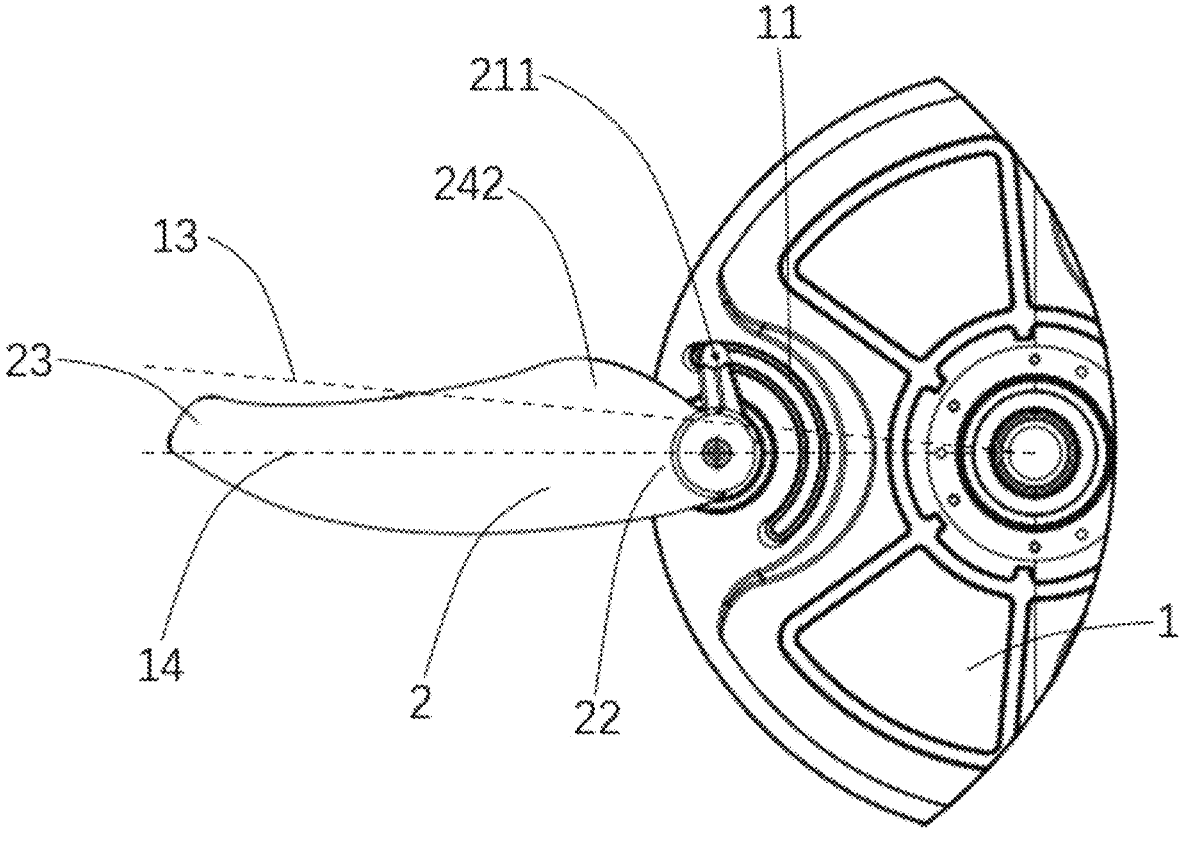
FIG. 4 is a partial enlarged view of the fan lamp in FIG. 1.

Please refer to FIG. 4, when the rotating disk 1 rotates, that is, when the fan blade 2 of the fan lamp 100 is expanded, the line connecting the center of gravity of the fan blade 2 and the rotation center of the fan lamp 100 is defined as the first connecting line 13, and the line connecting the rotation center of the mounting portion 21 and the rotation center of the fan lamp 100 is defined as the second connecting line 14, the angle between the first connecting line 13 and the second connecting line 14 is in a range from 0° to 18°, and in the rotation direction of the rotating disk 1, the first connecting line 13 is located behind the second connecting line 14.

Figure 6:
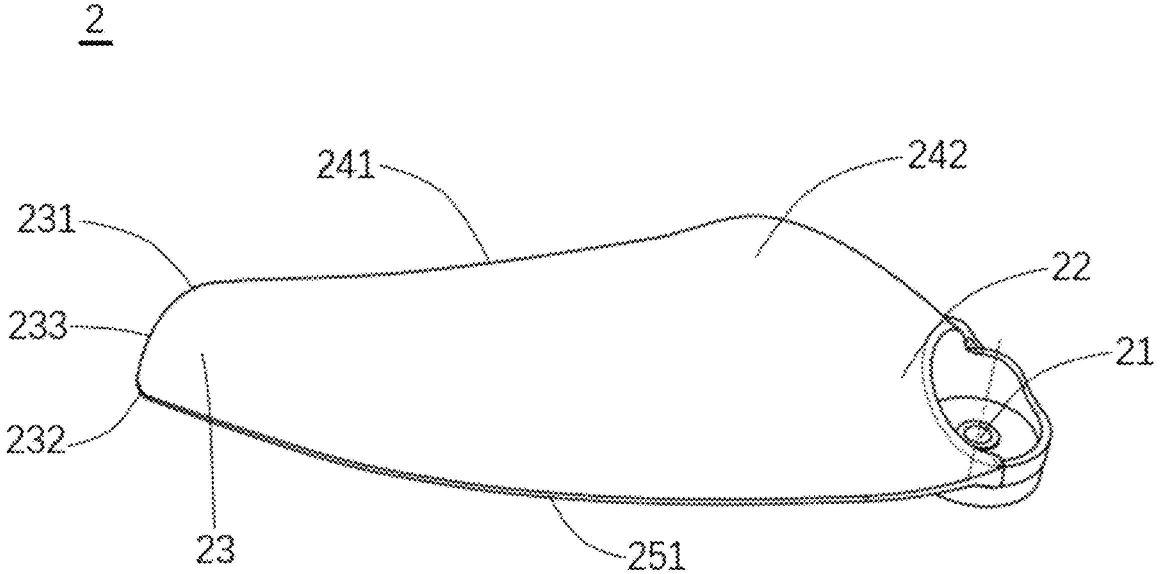
FIG. 6 is a schematic perspective view of the fan blade in FIG. 5 from a first angle.
Figure 7:
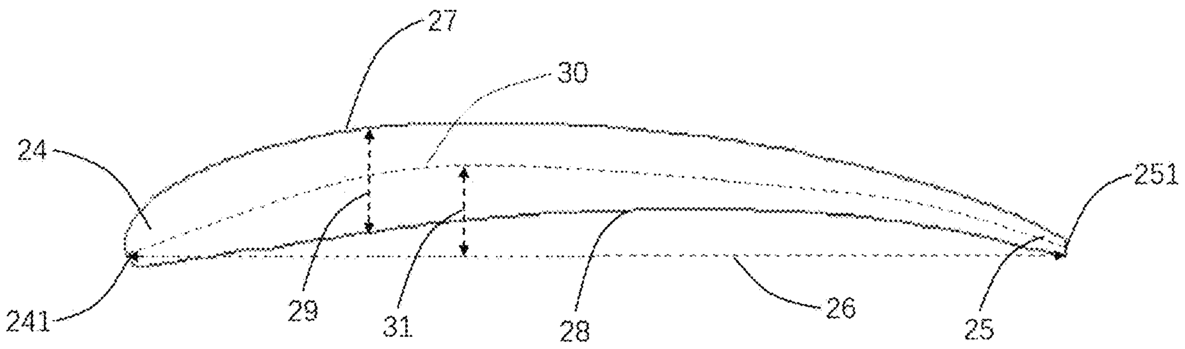
FIG. 7 is a schematic cross-sectional view of the fan blade in FIG. 5 along the chord line.

Referring to FIG. 5 to FIG. 7, the leading edge 241 of the fan blade 2 is arranged in a wavy shape from the blade root 22 toward the blade tip 23, the trailing edge 251 is arranged in an arc shape, so that the distance between the leading edge 241 and the trailing edge 251 first increases and then decreases from the blade root 22 toward the blade tip 23.

Specifically, the leading edge 241 includes a convex portion 242 extending from the middle of the leading edge 241 toward a direction away from the trailing edge 251, and the convex portion 242 is arranged close to the blade root 22. When the fan blade 2 rotates, the convex portion 242 can divide the air, so that the air flows along both sides of the convex portion 242, and then forms an airflow driven by the fan blade 2 and blows out outward, thereby increasing the air supply range of the fan blade 2 and weakening the air supply pressure directly below the fan blade 2. The convex portion 242 is provided in the middle of the leading edge 241 close to the blade root 22, so that the convex portion 242 diverts most of the air to the side away from the blade root 22, further increasing the air supply range of the fan blade 2.

Specifically, the connecting point of the fan blade 2 and the rotating disk 1 is the blade root 22 of the fan blade 2, the line connecting the blade root 22 and the blade tip 23 is the blade length 261, and the vertex of the convex portion 242 is defined as the leading edge point 243, that is, in the rotation direction of the fan blade 2, the distance between the leading edge point 243 and the trailing edge 251 is greater than the distance between any point on the leading edge 241 and the trailing edge 251. At the same time, it is defined that the leading edge point 243 has a first projection point on the blade length 261, and the distance between the first projection point and the blade root 22 accounts for 10%~45% of the length of the blade length 261. In other words, when the fan blade 2 rotates to supply air, the distance between the leading edge point 243 and the rotation plane 32 is greater than the distance between any point on the leading edge 241 and the rotation plane 32, that is, the leading edge point 243 is located at the highest point of the fan blade and the leading edge point 243 is located at the frontmost end of the fan blade 2 on the windward side.

The leading edge 241 is further provided with a concave portion 244 that is recessed toward the trailing edge 251, the concave portion 244 is arranged close to the blade tip 23, and the end of the concave portion 244 away from the blade tip 23 is connected to the end of the convex portion 242 away from the blade root 22, so that the leading edge 241 is in a wavy shape, and the connecting point of the convex portion 242 and the concave portion 244 is defined as the tangent point 245, that is, the tangent point 245 is located between the leading edge point 243 and the blade tip 23, and the tangent point 245 has a second projection point on the blade length 261, and the distance between the second projection point and the blade root 22 accounts for 35% to 60% of the length of the blade length 261. For example, in the case where the distance between the first projection point and the blade root 22 accounts for 10% of the length of the blade length 261, the ratio of the distance between the second projection point and the blade root 22 to the length of the blade length 261 is not less than 35% and not greater than 60%; in the case where the distance between the first projection point and the blade root 22 accounts for 45% of the length of the blade length 261, the ratio of the distance between the second projection point and the blade root 22 to the length of the blade length 261 is greater than 45% and not greater than 60%, so that the tangent point 245 can always be located between the leading edge point 243 and the blade tip 23.

The trailing edge 251 is curved in a direction away from the leading edge 241 and forms an arc shape. Specifically, the curve where the trailing edge 251 is located has a continuous change in the second derivative in the radial direction corresponding to the curve, and the chord length of the fan blade 2 first increases and then decreases along the direction from the blade root 22 to the blade tip 23, and finally decreases sharply. With this arrangement, on the one hand, the air is diverted and the air supply area is increased, and on the other hand, the appearance of the fan blade 2 is improved.

The fan blade 2 further includes a leading edge portion 24 provided on the windward side and a trailing edge portion 25 provided on the leeward side, the trailing edge 251 is located at the edge of the trailing edge portion 25 away from the fan blade 2, and the leading edge portion 24 is in an arc shape, the leading edge 241 is located at the edge of the leading edge portion 24 away from the fan blade 2, the angle corresponding to the arc of the leading edge portion 24 is greater than 90° and less than or equal to 180°, and the ratio of the radius to the chord length corresponding to the arc is in a range from 0.25% to 3%. This arrangement reduces the sound of the fan blade 2 cutting the air when the fan blade 2 rotates, and further reduces the noise generated when the fan blade 2 rotates.

The fan blade 2 further includes an upper surface 27 and a lower surface 28, the upper surface 27 and the lower surface 28 are connected to the blade root 22, the blade tip 23, the leading edge 241, and the trailing edge 251, respectively, and the upper surface 27 is provided on the side of the fan blade 2 away from the lamp assembly, and the lower surface 28 is provided on the side of the fan blade 2 close to the lamp assembly. Specifically, the upper surface 27 protrudes outward, and the lower surface 28 is recessed inward. During the rotation process, the air flows under the driving of the lower surface 28 to achieve outward blowing. The distance between the upper surface 27 and the lower surface 28 is defined as the thickness, the thickness of the fan blade 2 first gradually increases and then gradually decreases along the direction from the leading edge 241 to the trailing edge 251. In other words, in the direction of the chord line 26, the thickness first gradually increases and then gradually decreases in the direction from the leading edge 241 to the trailing edge 251, with this arrangement, a higher pressure difference is generated between the upper surface and lower surface 28 of the fan blade 2 to increase the air supply volume of the fan blade 2.

Specifically, in the cross section of the fan blade 2 in the direction of the chord line 26, there is a maximum thickness between the leading edge 241 and the trailing edge 251, and the thickness reaches a maximum value at 20% to 40% of the chord length measured from the leading edge 241, that is, the maximum thickness 29, the ratio of the maximum thickness 29 to the chord length corresponding to the maximum thickness 29 is in a range from 1% to 15%, and the ratio of the thickness of the trailing edge 25 to the chord length is in a range from 0.5% to 3%. That is to say, the thickness of the fan blade 2 in the cross section in the direction of the chord line 26 is uneven, being thin on both sides and thick in the middle, the maximum thickness 29 of the fan blade 2 is arranged close to the leading edge 241, and the thickness of the fan blade 2 has a certain ratio relationship with the chord length.

The ratio of the thickness of the side of the fan blade 2 close to the blade root 22 to the chord length is in a range from 6% to 20%. The ratio of the thickness of the side of the fan blade 2 close to the blade tip 23 to the chord length is in a range from 2% to 10%. Specifically, the fan blade is divided into two equal parts along the direction from the blade root 22 to the blade tip 23, and the ratio of the cross-sectional thickness of ½ of the fan blade 2 close to the blade root 22 along the chord line 26 to the chord length is in a range from 4% to 20%; the ratio of the cross-sectional thickness of the ½ of the fan blade 2 close to the blade tip 23 along the chord line 26 to the chord length is in a range from 2% to 10%. In short, the fan blade 2 is divided into two sections of equal length, and the thickness of the section close to the blade root 22 is greater than the thickness of the section close to the blade tip 23, so that the weight of the fan blade 2 is reduced while ensuring strength and increasing the air supply volume.

In the extension direction of the chord line 26, the line connecting the centers of multiple inscribed circles in the cross-section of the fan blade 2 along this direction is the center arc line 30, the maximum distance between the center arc line 30 and the chord line 26 is the maximum curvature 31, the ratio of the distance between the maximum curvature 31 and the leading edge 241 in each cross-section of the fan blade 2 to the chord length is in a range from 0.4:1 to 0.5:1, that is, the distance between the maximum curvature 31 and the leading edge 241 accounts for 40% to 50% of the chord length, and at the same time, the ratio of the maximum curvature 31 in each cross-section of the fan blade 2 to the chord length corresponding to the maximum curvature 31 is in a range from 6% to 12%, that is, the maximum curvature 31 of the fan blade 2 is arranged close to the blade root 22 so as to increase the air supply volume of the fan blade 2.

The blade tip 23 of the fan blade 2 further includes a first arc 231, a straight edge 233, and a second arc 232 that are connected to each other, the two ends of the straight edge 233 are connected to the first arc 231 and the second arc 232, respectively, the end of the first arc 231 away from the straight edge 233 is connected to the leading edge 241, and the end of the second arc 232 away from the straight edge 233 is connected to the trailing edge 251, the radius corresponding to the first arc 231 is 25~80 mm, and the radius corresponding to the second arc 232 is 2~10 mm, so that the air can be divided along the first arc 231 and the second arc 232 when contacting the first arc 231 and the second arc 232, thereby controlling the turbulence direction of the airflow at the blade tip 23. At the same time, the turbulence direction of the airflow is controlled by the first arc 231 and the second arc 232, thereby reducing the noise generated when the fan blade 2 rotates.

In this example, the center of gravity of the entire fan blade 2 is located in the vicinity of the leading edge portion 24, specifically in the convex portion 242. This arrangement can balance the aerodynamic force, centrifugal force and the torsion of the expanding spring, etc. of the fan blade 2 during the rotation process, so as to enhance the stability of operation. Specifically, the fan blade 2 of this example was tested with the other fan blade, in terms of weight, the weight of the fan blade 2 in this example is reduced by about 25% to 40% compared with the weight of the other fan blade; in terms of air supply angle, the air supply wide angle of the fan blade 2 in this example is increased by about 20% compared with the air supply wide angle of other fan blades; in terms of air supply volume, the air supply volume of the fan blade 2 in this example is increased by about 10% to 20% compared with the air supply volume of the other fan blade.

In this example, the fan blade 2 is rotatably connected to the rotating disk 1, and the fan blade 2 is retracted or expanded through the rotation of the rotating disk 1. Meanwhile, the rotating disk 1 is matched with the lamp assembly to meet people's needs for different functions, improving the practicality of the fan lamp 100.

In other examples, the fan blade 2 can also be directly used in a fan (not shown). In this case, the fan blade 2 is not provided with the mounting portion 21 and is not provided with the guide member 211. Specifically, the fan includes a hub (not shown) and the fan blade 2 connected to the hub, the blade root 22 of the fan blade 2 is directly and fixedly connected to the hub at a certain angle, the line connecting the leading edge 241 and the trailing edge 251 of the fan blade 2 and perpendicular to the direction from the blade root 22 to the blade tip 23 is the chord line 26, the plane when the fan rotates is the rotation plane 32, the installation angle β between the chord line 26 and the rotation plane 32 is in a range from 21° to 36°, and the installation angle β close to the blade tip 23 is in a range from 21° to 29°. Preferably, the fan blade is divided into four equal parts in the direction from the blade root 22 to the blade tip 23, the installation angle β between the chord line 26 within a quarter of the blade tip 23 and the rotation plane 32 is in a range from 21° to 29°. Meanwhile, when the fan blade 2 is used for a fan, the center point 20 is the connecting point of the fan blade 2 and the hub, and the change trend of the blade height 321 of the fan blade 2 is the same as that when the fan blade 2 is used for the fan lamp 100, there is no restriction here.

In summary, in the fan blade 2 of the present disclosure, by arranging the leading edge 241 in a wavy shape that first rises and then falls and then rises from the blade root 22 toward the blade tip 23, the fan blade 2 can divert air when rotating, increasing the air supply range of fan blade 2, and at the same time weakening the air supply pressure per unit area; by arranging the trailing edge 251 to be in an arc shape, the appearance of the fan blade 2 is beautified while ensuring that the performance of the fan blade 2 is improved; by providing the first arc 231 and the second arc 232 at the blade tip 23, the turbulence direction of the airflow at the blade tip 23 can be controlled, and the noise generated when the fan blade 2 rotates can be reduced.

The purpose of the present disclosure is to provide a fan blade, a fan and a fan lamp to solve at least one of the problems of small blowing area, concentrated wind speed, and loud noise of other fan lamps.

In order to achieve the above purpose, the present disclosure provides a fan blade, including a blade root, a blade tip, a leading edge connecting the blade root and the blade tip and located on a windward side, and a trailing edge connecting the blade root and the blade tip and located on a leeward side, the leading edge is arranged in a wavy shape from the blade root toward the blade tip, and the trailing edge is arranged in an arc shape, such that a distance between the leading edge and the trailing edge first increases and then decreases from the blade root toward the blade tip.

Further, the leading edge is provided with a convex portion protruding in a direction away from the trailing edge, the convex portion is arranged close to the blade root, and the trailing edge is curved in a direction away from the leading edge and forms an arc shape.

Further, a line connecting the blade root and the blade tip is defined as a blade length, and a vertex of the convex portion is the leading edge point, in a rotation direction of the fan blade, a distance between the leading edge point and the trailing edge is greater than a distance between any point on the leading edge and the trailing edge, defining that the leading edge point has a first projection point on the blade length, and a distance between the first projection point and the blade root accounts for 10%~45% of a length of the blade length.

Further, the leading edge is provided with a concave portion that is recessed toward the trailing edge, the concave portion is connected to the convex portion, and a connecting point of the convex portion and the concave portion is defined as a tangent point, and the tangent point is located between the leading edge point and the blade tip, defining that the tangent point has a second projection point on the blade length, and a distance between the second projection point and the blade root accounts for 35%~60% of the length of the blade length.

Further, after assembly of the fan blade, the lowest plane formed when the fan blade rotates is defined as a rotation plane, and a distance between the leading edge point and the rotation plane is greater than a distance between any point on the leading edge and the rotation plane.

Further, the blade tip includes a first arc, a straight edge, and a second arc, two ends of the straight edge is connected to the first arc and the second arc, respectively, and an end of the first arc away from the straight edge is connected to the leading edge, an end of the second arc away from the straight edge is connected to the trailing edge.

Further, a radius of the first arc is 25-80 mm, and a radius of the second arc is 2-10 mm.

Further, in a direction perpendicular to a direction from the blade root to the blade tip, a line connecting the leading edge and the trailing edge is defined as a chord line, a length of the chord line is a chord length, and in the direction from the blade root to the blade tip, the chord length first increases and then decreases.

Further, the fan blade includes an upper surface and a lower surface connected to the blade root, the blade tip, the leading edge, and the trailing edge, and a distance between the upper surface and the lower surface is defined as a thickness, and the thickness of the fan blade first gradually increases and then gradually decreases along a direction from the leading edge to the trailing edge.

Further, the thickness of the fan blade reaches a maximum value at 20%~40% of the chord length measured from the leading edge, a ratio of a maximum thickness of the fan blade to the chord length corresponding to the thickness is in a range from 1% to 15%, and a ratio of a thickness of the trailing edge to the chord length is in a range from 0.5% to 3%.

Further, a ratio of the thickness of a side of the fan blade close to the blade root to the chord length is in a range from 4% to 20%, a ratio of the thickness of a side of the fan blade close to the blade tip to the chord length is in a range from 2% to 10%.

In order to achieve the above purpose, the present disclosure provides a fan, including a hub and the above described fan blade connected to the hub.

Further, in a direction perpendicular to a direction from the blade root to the blade tip, a line connecting the leading edge and the trailing edge of the fan blade is defined as a chord line, a plane formed when the fan rotates is a rotation plane, and an angle between the chord line and the rotation plane is in a range from 21° to 36°, and the angle close to the blade tip is in a range from 21° to 29°.

In order to achieve the above purpose, the present disclosure provides a fan lamp, including a rotating disk and a plurality of fan blades as described above, the plurality of fan blades are arranged on the rotating disk in a retractable or expandable manner.

Further, in a direction perpendicular to a direction from the blade root to the blade tip, a line connecting the leading edge and the trailing edge of the fan blade is defined as a chord line, a plane formed when the rotating disk rotates is a rotation plane, and an angle between the chord line and the rotation plane is in a range from 21° to 36°, and the angle close to the blade tip is in a range from 21° to 29°.

Further, the fan blade includes a mounting portion rotatably connected to the rotating disk, and the fan blade is retracted or expanded relative to the rotating disk around the mounting portion, and upon the fan blade being expanded, a first connecting line is formed between a center of gravity of the fan blade and a rotation center of the fan lamp, and a second connecting line is formed between a rotation center of the mounting portion and the rotation center of the fan lamp, and an angle between the first connecting line and the second connecting line is in a range from 0° to 18°.

Further, a connecting point of the fan blade and the rotating disk is defined as a center point, and a distance between the leading edge and the rotation plane is a blade height, and the blade height first increases and then decreases from the blade root to the blade tip, the leading edge is provided with a leading edge point at which the blade height reaches a maximum value.

Further, the leading edge includes a fast descending stage and a decreasing stage extending from the leading edge point toward the blade tip, a line connecting the blade tip and the center point is defined as a blade length, a projection of the fast descending stage on the blade length is a first stage, and a projection of the decreasing stage on the blade length is a second stage, a ratio of a distance between any point in the first stage and the center point to a length of the blade length is not greater than 60%, and a ratio of a distance between any point in the second stage and the center point to the length of the blade length is in a range from 60% to 100%.

The beneficial effects of the present disclosure are as follows. In the fan blade of the present disclosure, by arranging the leading edge in a wave shape that first rises and then falls and then rises from the blade root toward the blade tip, the fan blade can divert the air when rotating, increasing the air supply range of the fan blade while weakening the air supply pressure per unit area, by arranging the trailing edge to be in an arc shape, the appearance of the fan blade can be beautified while ensuring that the performance of the fan blade is improved.

The above examples are only used to illustrate the technical solutions of the present disclosure, but not to limit the technical solutions of the present disclosure. Although the present disclosure has been described in detail with reference to examples, those of ordinary skill in the art should understand that the technical solutions of the present disclosure can be modified or equivalently replaced without departing from the spirit and scope of the technical solution of the present disclosure.

The invention claimed is:

1. A fan blade, comprising:

a blade root, a blade tip, a leading edge connecting the blade root and the blade tip wherein the leading edge is located on a windward side, and a trailing edge connecting the blade root and the blade tip wherein the trailing edge is located on a leeward side, wherein:

the leading edge is arranged in a wavy shape from the blade root toward the blade tip, and the trailing edge is arranged in an arc shape, such that a distance between the leading edge and the trailing edge first increases and then decreases from the blade root toward the blade tip, the blade tip comprises a first arc, a straight edge, and a second arc, two ends of the straight edge are connected to the first arc and the second arc, and an end of the first arc away from the straight edge is connected to the leading edge, an end of the second arc away from the straight edge is connected to the trailing edge, a radius of the first arc is 25-80 mm, and a radius of the second arc is 2-10 mm.

2. The fan blade according to claim 1, wherein:
the leading edge is provided with a convex portion protruding in a direction away from the trailing edge, the convex portion is arranged close to the blade root, and the trailing edge is curved in a direction away from the leading edge and forms an arc shape.

3. The fan blade according to claim 2, wherein:
a line that connects the blade root and the blade tip is defined as a blade length, and a vertex of the convex portion is a leading edge point,
in a rotation direction of the fan blade, a distance between the leading edge point and the trailing edge is greater than a distance between any point on the leading edge and the trailing edge, and the leading edge point has a first projection point on the blade length, and
a distance between the first projection point and the blade root accounts for 10%~45% of a length of the blade length.

4. The fan blade according to claim 3, wherein:
the leading edge is provided with a concave portion that is recessed toward the trailing edge, the concave portion is connected to the convex portion,
a connecting point of the convex portion and the concave portion is defined as a tangent point, and the tangent point is located between the leading edge point and the blade tip, and the tangent point has a second projection point on the blade length, and
a distance between the second projection point and the blade root accounts for 35%~60% of the length of the blade length.

5. The fan blade according to claim 3, wherein, after assembly of the fan blade, the lowest plane formed when the fan blade rotates is defined as a rotation plane, and a distance between the leading edge point and the rotation plane is greater than a distance between any point on the leading edge and the rotation plane.

6. The fan blade according to claim 1, wherein:
in a direction perpendicular to a direction from the blade root to the blade tip, a line that connects the leading edge and the trailing edge is defined as a chord line, a length of the chord line is a chord length, and
in the direction from the blade root to the blade tip, the chord length first increases and then decreases;
the fan blade comprises an upper surface and a lower surface connected to the blade root, the blade tip, the leading edge, and the trailing edge, and a distance between the upper surface and the lower surface is defined as a thickness, and
the thickness of the fan blade first gradually increases and then gradually decreases along a direction from the leading edge to the trailing edge.

7. The fan blade according to claim 6, wherein the thickness of the fan blade reaches a maximum value at 20%~40% of the chord length measured from the leading edge, a ratio of a maximum thickness of the fan blade to the chord length corresponding to the thickness is in a range from 1% to 15%, and a ratio of a thickness of the trailing edge to the chord length is in a range from 0.5% to 3%.

8. The fan blade according to claim 6, wherein a ratio of the thickness of a side of the fan blade close to the blade root to the chord length is in a range from 4% to 20%, a ratio of the thickness of a side of the fan blade close to the blade tip to the chord length is in a range from 2% to 10%.

9. A fan, comprising a hub and a fan blade that is connected to the hub, wherein the fan blade comprises:
a blade root,
a blade tip,
a leading edge connecting the blade root and the blade tip wherein the leading edge is located on a windward side, and
a trailing edge connecting the blade root and the blade tip wherein the trailing edge is located on a leeward side, wherein:
the leading edge is arranged in a wavy shape from the blade root toward the blade tip, and the trailing edge is arranged in an arc shape, such that a distance between the leading edge and the trailing edge first increases and then decreases from the blade root toward the blade tip,
the blade tip comprises a first arc, a straight edge, and a second arc,
two ends of the straight edge are connected to the first arc and the second arc, and
an end of the first arc away from the straight edge is connected to the leading edge, an end of the second arc away from the straight edge is connected to the trailing edge, a radius of the first arc is 25-80 mm, and a radius of the second arc is 2-10 mm.

10. The fan according to claim 9, wherein:
in a direction perpendicular to a direction from the blade root to the blade tip, a line that connects the leading edge and the trailing edge of the fan blade is defined as a chord line, a plane formed when the fan rotates is a rotation plane, and an angle between the chord line and the rotation plane is in a range from 21° to 36°, and the angle close to the blade tip is in a range from 21° to 29°.

11. A fan lamp, comprising a rotating disk and a plurality of fan blades, wherein one of the plurality of fan blades comprises:
a blade root,
a blade tip,
a leading edge connecting the blade root and the blade tip wherein the leading edge is located on a windward side, and
a trailing edge connecting the blade root and the blade tip wherein the trailing edge is located on a leeward side, wherein:
the leading edge is arranged in a wavy shape from the blade root toward the blade tip, and the trailing edge is arranged in an arc shape, such that a distance between the leading edge and the trailing edge first increases and then decreases from the blade root toward the blade tip,
the blade tip comprises a first arc, a straight edge, and a second arc,
two ends of the straight edge are connected to the first arc and the second arc, and
an end of the first arc away from the straight edge is connected to the leading edge, an end of the second arc away from the straight edge is connected to the trailing edge, a radius of the first arc is 25-80 mm, and a radius of the second arc is 2-10 mm; and
the plurality of fan blades are arranged on the rotating disk in a retractable or expandable manner.

12. The fan lamp according to claim 11, wherein:
in a direction perpendicular to a direction from the blade root to the blade tip, a line that connects the leading edge and the trailing edge of the fan blade is defined as a chord line, a plane formed when the rotating disk rotates is a rotation plane, and an angle between the chord line and the rotation plane is in a range from 21° to 36°, and the angle close to the blade tip is in a range from 21° to 29°.

13. The fan lamp according to claim 11, wherein:

the fan blade comprises a mounting portion rotatably connected to the rotating disk, and the fan blade is retracted or expanded relative to the rotating disk around the mounting portion, and upon the fan blade being expanded, a first connecting line is formed between a center of gravity of the fan blade and a rotation center of the fan lamp, and a second connecting line is formed between a rotation center of the mounting portion and the rotation center of the fan lamp, and an angle between the first connecting line and the second connecting line is in a range from 0° to 18°.

14. The fan lamp according to claim 12, wherein:

a connecting point of the fan blade and the rotating disk is defined as a center point, and a distance between the leading edge and the rotation plane is a blade height, and the blade height first increases and then decreases from the blade root to the blade tip, and the leading edge is provided with a leading edge point at which the blade height reaches a maximum value.

* * * * *